US009232564B2

(12) United States Patent
Medapalli et al.

(10) Patent No.: US 9,232,564 B2
(45) Date of Patent: *Jan. 5, 2016

(54) WIRELESS TRANSCEIVERS WITH FILTER ARRANGEMENT FOR WIFI AND LTE COEXISTENCE

(71) Applicant: Broadcom Corporation, Irvine, CA (US)

(72) Inventors: Kamesh Medapalli, San Jose, CA (US); Erik Stauffer, Mountain View, CA (US); Bertrand Hochwald, South Bend, IN (US); William Fujimoto, San Jose, CA (US); Joseph Saada, Haifa, IL (US); Richard Compton, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/163,571

(22) Filed: Jan. 24, 2014

(65) Prior Publication Data

US 2014/0141732 A1    May 22, 2014

Related U.S. Application Data

(63) Continuation of application No. 13/211,933, filed on Aug. 17, 2011, now Pat. No. 8,681,748.

(60) Provisional application No. 61/374,309, filed on Aug. 17, 2010.

(51) Int. Cl.
*H04W 4/00* (2009.01)
*H04W 88/06* (2009.01)
(Continued)

(52) U.S. Cl.
CPC ............... *H04W 88/06* (2013.01); *H04B 1/406* (2013.01); *H04B 1/44* (2013.01); *H04B 1/525* (2013.01)

(58) Field of Classification Search
CPC ...... H04L 5/0048; H04L 43/16; H04B 3/544; H04B 3/46
USPC ................ 370/310–350; 455/63.1, 88, 232.1, 455/277.1, 553.1
See application file for complete search history.

(56) References Cited

U.S. PATENT DOCUMENTS

2005/0254442 A1* 11/2005 Proctor et al. ................ 370/294
2006/0103485 A1*  5/2006 Okuyama et al. ............. 333/132
(Continued)

FOREIGN PATENT DOCUMENTS

CN          1787390 A       6/2006
CN      101 594 669 A      12/2009
(Continued)

OTHER PUBLICATIONS

Office Action for related Chinese Patent Application No. 201110235866, mailed Nov. 6, 2013; 6 pages.
(Continued)

*Primary Examiner* — Mang Yeung
(74) *Attorney, Agent, or Firm* — Sterne, Kessler, Goldstein & Fox P.L.L.C.

(57) ABSTRACT

Embodiments provide WiFi and LTE tailored transceiver radio frequency (RF) filtering techniques and configurations to enable coexistence between WiFi and LTE transceivers operating in close proximity. In particular, embodiments provide filtering techniques to reject emissions from LTE into WiFi, and vice versa. The filtering techniques eliminate the need for additional isolation between LTE and WiFi antennas (approximately 50 dB), which is beyond what is achievable in practice. Embodiments can be tailored according to different use cases of the WiFi and LTE transceivers (e.g., fixed CPE, portable router, smart phone with tethering).

20 Claims, 6 Drawing Sheets

(51) Int. Cl.
*H04B 1/403* (2015.01)
*H04B 1/525* (2015.01)
*H04B 1/44* (2006.01)

(56) References Cited

U.S. PATENT DOCUMENTS

| | | | |
|---|---|---|---|
| 2006/0121937 A1* | 6/2006 | Son | 455/553.1 |
| 2009/0262669 A1* | 10/2009 | Sanders | 370/278 |
| 2010/0226292 A1* | 9/2010 | Gorbachov | 370/280 |
| 2011/0312288 A1* | 12/2011 | Fu et al. | 455/88 |
| 2012/0044919 A1 | 2/2012 | Medapalli et al. | |
| 2012/0230252 A1* | 9/2012 | Yang | 370/328 |
| 2012/0231729 A1* | 9/2012 | Xu et al. | 455/13.4 |

FOREIGN PATENT DOCUMENTS

| | | |
|---|---|---|
| EP | 1 670 153 A2 | 6/2006 |
| EP | 1 729 464 A1 | 12/2006 |
| EP | 1 768 269 A1 | 3/2007 |
| WO | WO 2005/104389 A1 | 11/2005 |
| WO | WO 2005104389 A1 * | 11/2005 |
| WO | WO 2010/145143 A1 | 12/2010 |
| WO | WO 2010145143 A1 * | 12/2010 |

OTHER PUBLICATIONS

European Search Report for EP Application No. EP 11 00 6661, The Hague, Netherlands, mailed on Mar. 6, 2013.

* cited by examiner

WIRELESS TRANSCEIVERS WITH FILTER ARRANGEMENT FOR WIFI AND LTE COEXISTENCE

CROSS-REFERENCE TO RELATED APPLICATION(S)

The present application is a continuation of U.S. application Ser. No. 13/211,933, filed Aug. 17, 2011, which claims the benefit of U.S. Provisional Application No. 61/374,309, filed Aug. 17, 2010, both of which are incorporated herein by reference in their entireties.

BACKGROUND

1. Field of the Invention

The present invention relates generally to wireless communications.

2. Background Art

According to the IEEE (Institute of Electrical and Electronics Engineers) 802.11 standard, WiFi devices may operate on eleven channels (channels 1 through 11) located in the 2.4-GHz ISM (Industrial, Scientific, Medical) band, which spans from 2400 MHz to 2483.5 MHz. Each WiFi Channel is 22 MHz wide, and consecutive WiFi channels are separated by 5 MHz. Channels 1, 6, and 11 are non-overlapping channels centered at 2412 MHz, 2437 MHz, and 2462 MHz, respectively.

The WiMAX (Worldwide Interoperability for Microwave Access) forum has published three licensed spectrum profiles (2.3 GHz, 2.5 GHz, and 3.5 GHz) for IEEE 802.16e WiMAX devices. The 2.5 GHz spectrum profile corresponds to the Federal Communication Commission (FCC) Broadband Radio Service (BRS) band (2496 MHz to 2690 MHz). The FCC BRS band is divided in 5.5-MHz or 11-MHz channels with corresponding 5-MHz and 10-MHz WiMAX system bandwidths.

Accordingly, in certain scenarios, the guard band between WiFi and WiMAX operating bands may be less than 20-MHZ (e.g., in the case of WiFi operating on channel 11 and WiMAX using an 10-MHz channel centered at 2496 MHz, only 18 MHz separate the operating channels). Thus, when a WiFi transceiver and a WiMAX transceiver operate in close proximity to each other, the two transceivers may interfere with one another in the absence of synchronization. Accordingly, there is a need to ensure coexistence between WiFi transceivers and WiMAX transceivers operating in close proximity to each others.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
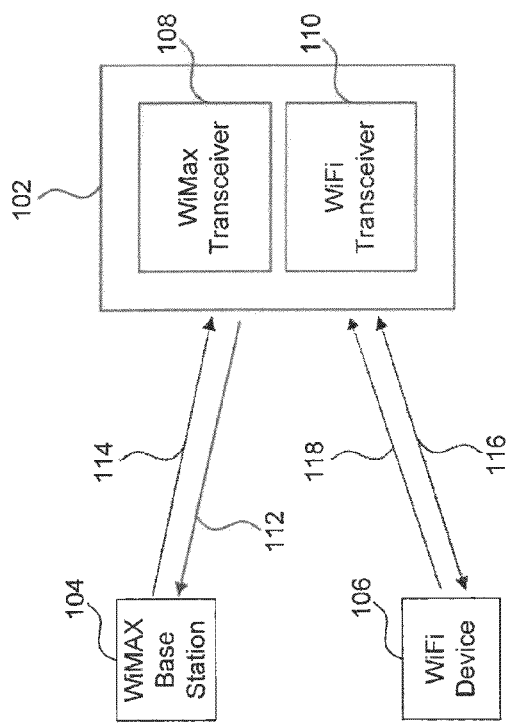
FIG. 1 is an example in which WiMAX-based and WiFi-based communications may occur simultaneously in close proximity.

FIG. 1 is an example 100 in which WiMAX-based and WiFi-based communications may occur simultaneously in close proximity. As shown in FIG. 1, example 100 includes a WiFi/WiMAX (WiWi) device 102, a WiMAX base station 104, and a WiFi device 106.

Device 102 includes a WiMAX transceiver 108 and a WiFi transceiver 110. Device 102 may be a fixed CPE (Customer-Premises Equipment), a WiWi portable router, or a WiFi/WiMAX-enabled smart phone with a tethering feature, for example.

Device 102 communicates, via WiMAX transceiver 108, with WiMAX base station 104. Device 102 establishes a WiMAX-based uplink communication channel 112 and a WiMAX-based downlink communication channel 114 with WiMAX base station 104. Communications between device 102 and WiMAX base station 104 are in accordance with the IEEE 802.16 standard. Up link communication channel 112 and downlink communication channel 114 may use the same or different channel frequencies (i.e., communications between device 102 and WiMAX base station 104 may be Time Division Duplexing (TDD)-based or Frequency Division Duplexing (FDD)-based). WiMAX base station 104 is connected to a WiMAX network (not shown in FIG. 1), and thus provides WiMAX-based Internet connectivity to device 102.

Device 102 communicates, via WiFi transceiver 110, with WiFi device 106. Device 102 establishes a WiFi-based transmit communication channel 116 and a WiFi-based receive communication channel 118 with WiFi device 106. Communications between device 102 and WiFi device 106 are in accordance with the IEEE 802.11 standard. Transmit communication channel 116 and receive communication channel 118 use same channel frequencies in a TDD manner. WiFi device 106 may be a laptop computer or a smart phone, for example.

Using the setup described above, device 102 provides broadband Internet access to WiFi device 106. In particular, device 102 receives WiFi data from WiFi device 106 over receive communication channel 118, converts the received WiFi data to WiMAX data, and transmits the WiMAX data over uplink communication channel 112 to WiMAX base station 104. In addition, device 102 receives WiMAX data from WiMAX base station 104 over downlink communication channel 114, converts the received WiMAX data to WiFi data, and transmits the WiFi data over transmit communication channel 116 to WiFi device 106.

Figure 2:
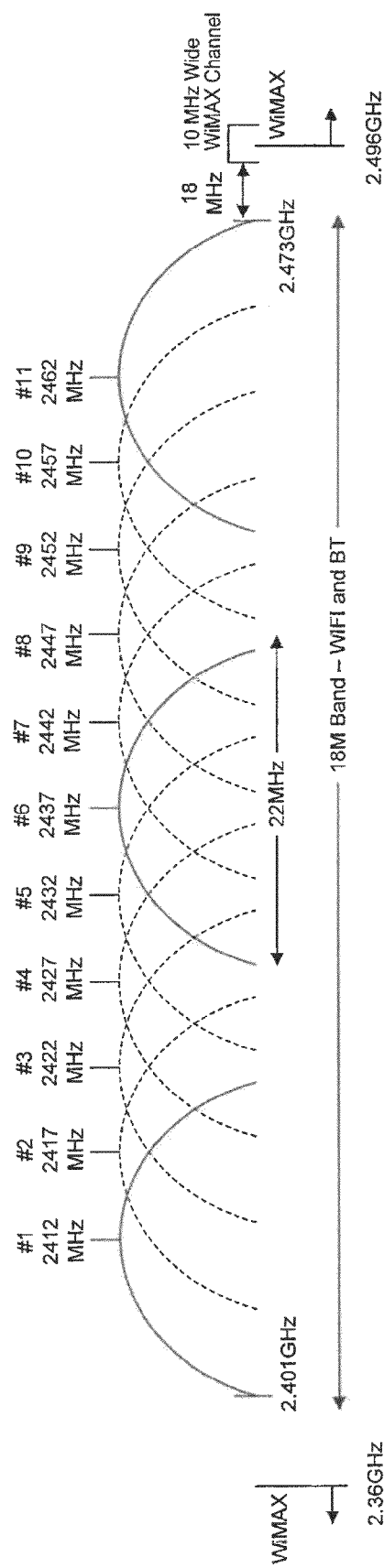
FIG. 2 illustrates the IEEE 802.11 WiFi channel plan.

FIG. 2 illustrates the IEEE 802.11 WiFi channel plan. According to the IEEE 802.11 standard, WiFi devices may operate on eleven channels (channels 1 through 11) located in the 24-GHz ISM (Industrial, Scientific, Medical) band, which spans from 2400 MHz to 2483.5 MHz, Each WiFi channel is 22 MHz wide, and consecutive WiFi channels are separated by 5 MHz. Channels 1, 6, and 11 are non-overlapping channels centered at 2412 MHz, 2437 MHz, and 2462 MHz, respectively. Most WiFi devices use one of channels 1, 6, and 11, and the selected channel is used both for transmitting and receiving.

The WiMAX forum has published three licensed spectrum profiles (2.3 GHz, 2.5 GHz, and 3.5 GHz) for IEEE 802.16e WiMAX devices. The 2.3 GHz and the 2.5 GHz spectrum profiles are indicated by their upper and lower ends, respectively, in FIG. 2. The 2.5 GHz spectrum profile corresponds to the Federal Communication Commission (FCC) Broadband Radio Service (BRS) band (2496 MHz to 2690 MHz). The FCC BRS band is divided in 5.5-MHz or 11-MHz channels with corresponding 5-MHz and 10-MHz WiMAX system bandwidths.

Accordingly, in certain scenarios, the guard band between WiFi and WiMAX operating bands may be less than 20-MHZ (e.g., in the case of WiFi operating on channel 11 and WiMAX using an 10-MHz channel centered at 2496 MHz, only 18 MHz separate the operating channels). Thus, when a WiFi transceiver and a WiMAX transceiver operate in close proximity to each other (as in the case of WiMAX transceiver 108 and WiFi transceiver 110, which are co-located in device 102), the two transceivers may interfere with one another in the absence of synchronization.

For example, WiMAX-based transmissions from WiMAX transceiver 108 may affect the reception of WiFi-based communications by WiFi transceiver 110. Conversely, WiFi-based transmissions by WiFi transceiver 110 may affect the reception of WiMAX-based communications by WiMAX transceiver 108. Particularly, broadband noise emissions from the WiFi (WiMAX) transmitter in the WiMAX (WiFi) band can inject noise at the WiMAX (WiFi) receiver antenna at a level possibly lower, equal, or higher than the thermal noise floor of the WiMAX (WiFi) receiver. In addition, the WiFi (WiMAX) channel energy at the WiMAX (WiFi) receiver antenna may be at a level that induces compression of the receiver.

Furthermore, simultaneous transmissions from two nearby transmitters at close frequency separation may cause third-order intermodulation (IM3) distortion at the power amplifier (PA) output due to energy from one transmitter leaking into the other transceiver. This is of particular concern when dealing with WiFi and WiMAX radios with insufficient radio frequency (RF) isolation between the two, as it may cause the WiMAX transmitter to violate the FCC spectrum mask.

Due to interference, both the WiMAX and WiFi receivers (of WiMAX transceiver 108 and WiFi transceiver 110, respectively) may experience significant performance degradation (receiver sensitivity degradation) resulting in a decrease in link throughput. Typically, interference between the WiFi and WiMAX transmitter/receiver pairs can be reduced by isolating the WiMAX and WiFi antennas. In practice, isolation between 20 dB and 30 dB is achievable. However, even with 26 dB of antenna isolation, up to 25 dB drop in the WiFi range can still be experienced due to interference, a significant drop in coverage especially for a home CPE (a rule of thumb in WiFi propagation is that a 20-dB reduction in path-loss equates to roughly one single room of WiFi range inside a home). In fact, experimental tests have shown that more than 81 dB of antenna isolation is required to alleviate this 25 dB WiFi coverage drop (in experiments, at 26 dB of antenna isolation, the WiFi uplink ceased to work at a path-loss of approximately 78 dB in the presence of WiMAX uplink traffic. With 81 dB of antenna isolation, the WiFi uplink continued to work until the path-loss was at 103 dB, i.e., 25 dB higher than in the case with 26 dB of antenna isolation). Such isolation (i.e., 81 dB), however, is extremely difficult, if not impossible, in practice.

Embodiments of the present invention, as further described below, provide WiFi and WiMAX tailored transceiver RF filtering techniques and configurations to enable coexistence between WiFi and WiMAX transceivers operating in close proximity (e.g., co-located inside the same device). In particular, embodiments provide filtering techniques to reject emissions from WiMAX into WiFi, and vice versa. The filtering techniques eliminate the need for additional isolation between WiMAX and WiFi antennas (approximately 50 dB), which is beyond what is achievable in practice. As further described below, embodiments can be tailored according to different use cases of the WiFi and WiMAX transceivers (e.g., in a fixed CPE, portable router, or smart phone with tethering). Embodiments can also be tailored according to required range (normal range or short range) of the WiFi application.

In the following, example WiMAX and WiFi transceivers according to embodiments are provided. These examples are provided for the purpose of illustration and are not limiting of embodiments of the present invention. WiWi devices according to embodiments (such as device 102, for example) can be implemented using any combination of the example WiMAX and WiFi transceivers described below.

Figure 3:
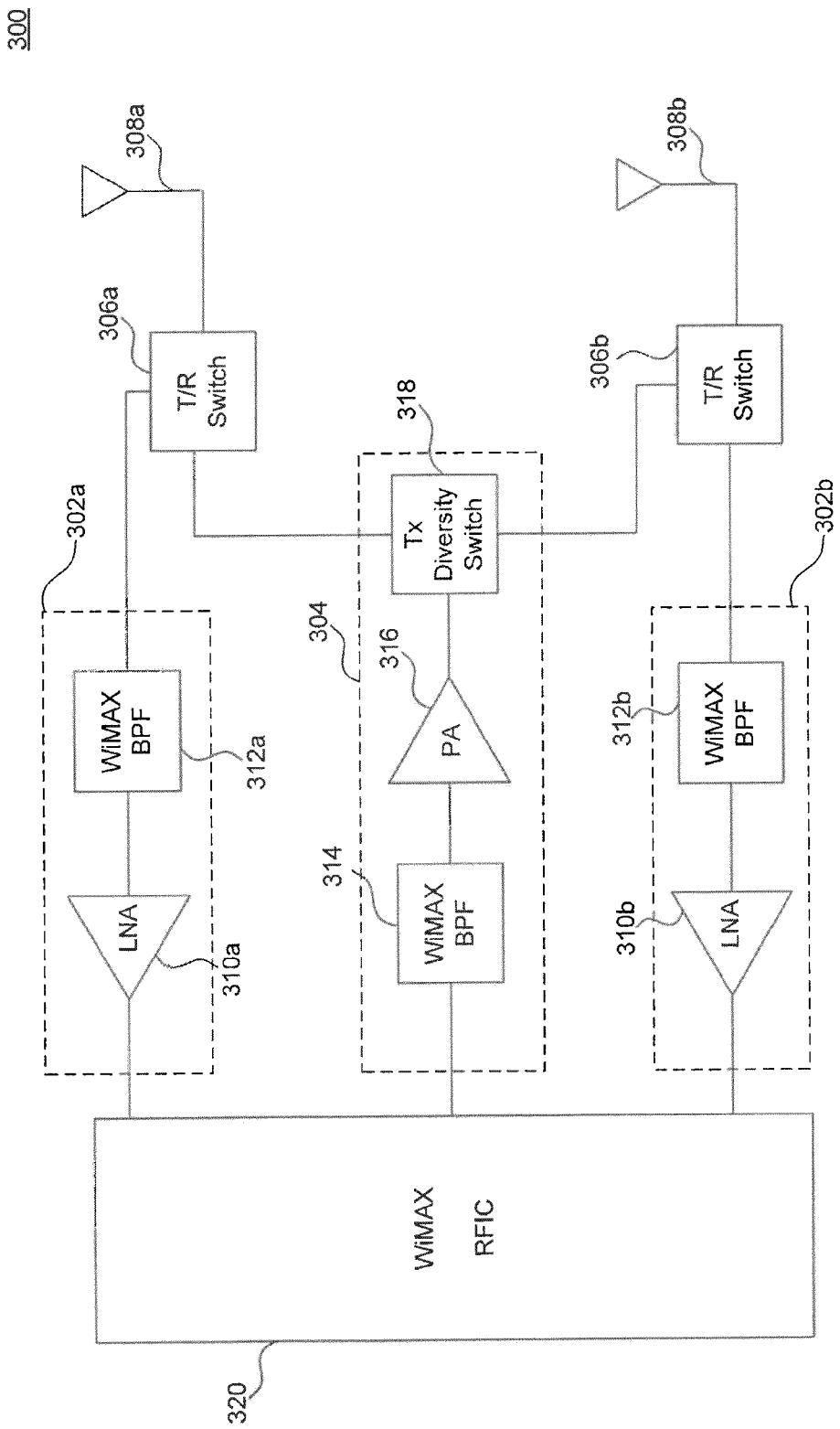
FIG. 3 illustrates an example WiMAX transceiver according to an embodiment of the present invention.

FIG. 3 illustrates an example WiMAX transceiver 300 according to an embodiment of the present invention. Transceiver 300 may be used in WiWi device 102 for WiMAX transceiver 108. Transceiver 300 is most suitable for use in a fixed WiWi CPE, but may also be used in a WiWi portable router or smart phone.

As shown in FIG. 3, transceiver 300 includes a WiMAX RF integrated circuit (RFIC) 320 coupled to a RF analog front end. WiMAX RFIC 320 includes an RF input/output section, a RE to baseband section, and a baseband to RF section (not shown in FIG. 3).

Transceiver 300 employs a multiple-input-multiple-output (MIMO) architecture. The RF analog front end includes first and second receive paths 302a and 302b, a transmit path 304, first and second transmit/receive (T/R) switches 306a and 306b, and first and second antennas 308a and 308b.

First T/R switch 306a couples first receive path 302a and transmit path 304 to first antenna 308a, and allows first receive path 302a and transmit path 304 to share first antenna 308a. Similarly, second T/R switch 306b couples second receive path 302b and transmit path 304 to second antenna 308b, and allows second receive path 302b and transmit path 304 to share second antenna 308b.

Transmit path 304 includes a WiMAX band-pass filter (BPF) 314, a power amplifier (PA) 316, and a transmit (TX) diversity switch 318. WiMAX BPF 314 band-pass filters WiMAX transmissions from WiMAX RFIC 320 to eliminate or reduce any out-of-WiMAX-hand emissions Which can affect the reception of a co-located (or proximate) WiFi transceiver. As noted above, without WiMAX transmit filtering, approximately 25 dB in WiFi range reduction could be incurred. Thus, improved WiFi performance can be attributed to WiMAX BPF 314.

As shown in FIG. 3, WiMAX BPF 314 is placed between WiMAX RFIC 320 and PA 316, i.e., before PA 316. The placement of WiMAX BPF 314 before PA 316 (as opposed to after PA 316) is significant for optimal performance, as further explained below.

WiMAX BPF filter 314 has, typically, a 2 dB filter insertion loss at a particular WiMAX center frequency. This insertion loss corresponds to a 2 dB loss in uplink WiMAX link budget, which is highly prohibitive from a WiMAX operator perspective. To compensate for the insertion loss of WiMAX BPF 314, the gain of transmit path 304 must be increased. If WiMAX BPF 314 is placed after PA 316, the insertion loss would have to be offset by increasing the transmit power of PA 316. This, however, is undesirable because PA 316 is typically optimized for a particular output power (e.g., 27 dBm), and increasing the transmit power of PA 316 could cause undesired effects such as the FCC spectrum mask being violated. In contrast, by placing WiMAX BPF 314 before PA 316, the insertion loss can be offset by simply increasing the gain of WiMAX RFIC 320. As such, PA 316 operates as normal, maintaining the desired output power level (e.g., 27 dBm) and satisfying the FCC spectrum mask.

TX diversity switch 318 couples transmit path 304 to both T/R switches 3W06a and 306b, thereby allowing transceiver 300 to transmit simultaneously using both antennas 308a and 308b.

First and second receive paths 302a and 302b each includes a WiMAX BPF 312 and a low-noise amplifier (LNA) 310. WiMAX BPFs 312 band-pass filter received signals to eliminate or reduce any out-of-WiMAX-band signals or noise which can affect the WiMAX reception of transceiver 300.

As shown in FIG. 3, WiMAX BPFs 312 are placed before LNAs 310 in first and second receive paths 302a and 302b. The placement of WiMAX BPFs 312 before LNAs 310 (as opposed to after LNAs 310) is significant for optimal performance. Specifically, by placing WiMAX BPFs 312a and 312b before LNAs 310a and 310b, respectively, LNAs 310a and 312b are protected from large saturating signals (e.g., from a strong adjacent interferer, such as an adjacent WiFi transceiver), which improves the WiMAX receiver blocking performance. In fact, experimental tests have shown that WiMAX downlink performance is affected not only by WiMAX band emissions from WiFi but also by the blocking effect of a strong adjacent interferer seen by the WiMAX receiver. As such, there is a need to increase the WiMAX receiver blocking performance, which can be achieved by placing BPFs 312 before LNAs 310.

WiMAX BPFs 312 may be identical to or different from WiMAX BPF 314. It is desirable that BPFs 312 and BPF 314 have low insertion loss (between 1.5 dB and 2.2 dB, for example), and effective rejection of WiFi channels 1, 6, and 11. In an embodiment, BPFs 312 and BPF 314 are Cirocomm® WiMAX band-pass filters (part number: 587A-0409).

Figure 4:
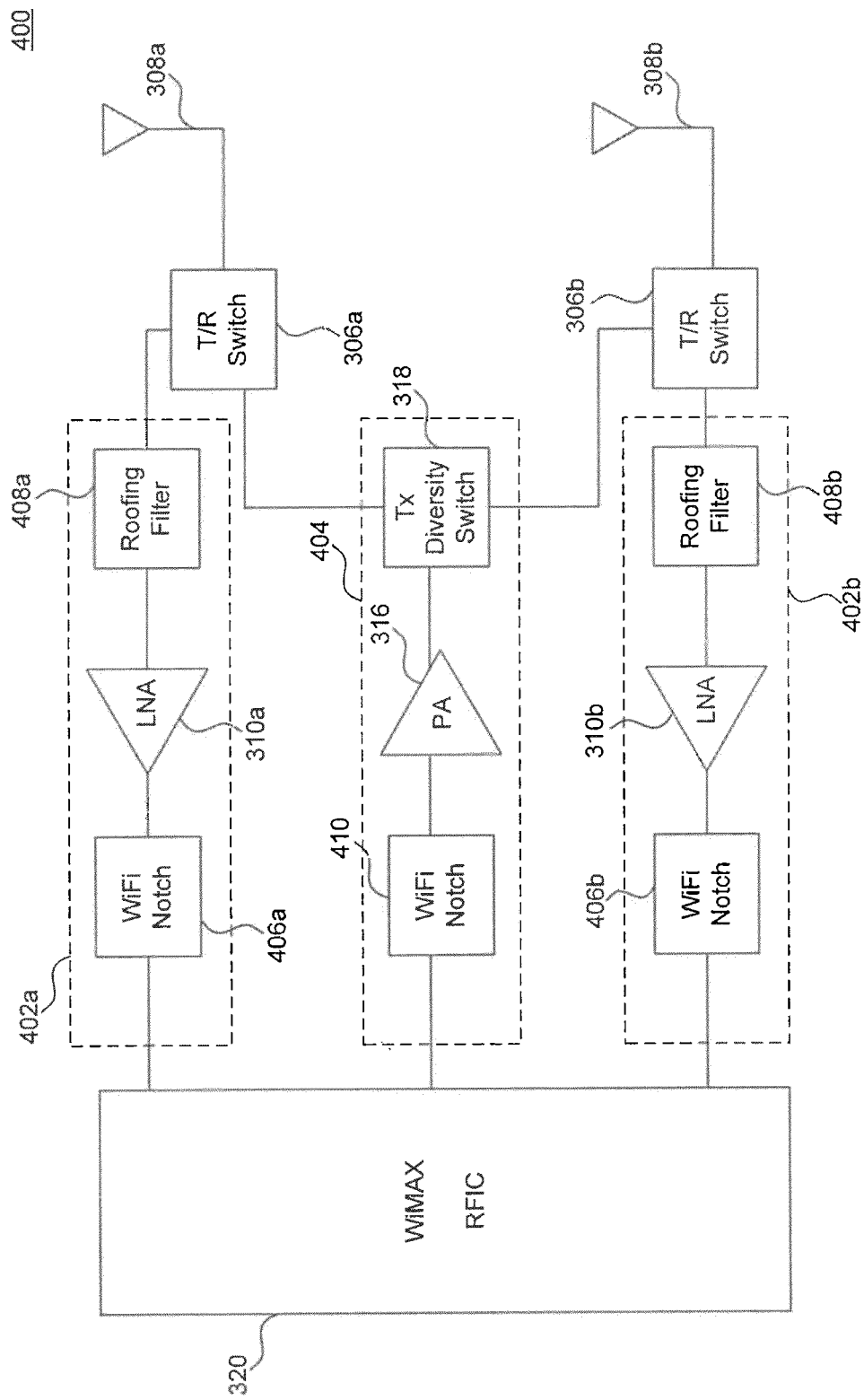
FIG. 4 illustrates an example WiMAX transceiver according to an embodiment of the present invention.

FIG. 4 illustrates another example WiMAX transceiver 400 according to an embodiment of the present invention. Transceiver 400 may be used in WiWi device 102 for WiMAX transceiver 108. Transceiver 400 is most suitable for use in a portable router or phone that provides normal WiFi range (100 feet), but may also be used in a fixed WiWi CPE.

As shown in FIG. 4, transceiver 400 includes a WiMAX RFIC 320 coupled to a RF analog front end. WiMAX RFIC 320 includes an RF input/output section, a RF to baseband section, and a baseband to RF section (not shown in FIG. 4).

Like transceiver 300, transceiver 400 employs a multiple-input-multiple-output (MIMO) architecture. The RF analog front end includes first and second receive paths 402a and 402b, a transmit path 404, first and second T/R switches 306a and 306b, and first and second antennas 308a and 308b.

First T/R switch 306a couples first receive path 402a and transmit path 404 to first antenna 308a, and allows first receive path 402a and transmit path 404 to share first antenna 308a. Similarly, second T/R switch 306b couples second receive path 402b and transmit path 404 to second antenna 308b, and allows second receive path 402b and transmit path 404 to share second antenna 308b.

Transmit path 404 includes a WiFi notch filter 410, a power amplifier (PA) 316, and a TX diversity switch 318. WiFi notch filter 410 in transmit path 404 replaces WiMAX BPF 314 in transmit path 304 of transceiver 300. The usage of WiFi notch filter 410 instead of WiMAX BPF 314 is done due to space limitations in a portable router or phone. In an embodiment, WiFi notch filter 410 is a bulk acoustic wave (BAW) filter and is very small in size, and thus very suitable for small form factor devices such as portable routers or phones. WiFi notch filter 410 notches out emissions generated by WiMAX RFIC 320 having frequency content in the WiFi band. Thus, improved WiFi performance can be attributed to WiFi notch filter 410.

As shown in FIG. 4, WiFi notch filter 410 is placed between WiMAX RFIC 320 and PA 316, i.e., before PA 316. The placement of WiFi notch filter 410 before PA 316 (as opposed to after PA 316) is significant for optimal performance, as further explained below.

WiFi notch filter 410 has, typically, approximately 2 dB filter insertion loss at a particular WiMAX center frequency (in an embodiment, WiFi notch filter 410 has higher insertion loss than WiMAX BPF 314 for center frequencies below 2506 MHz, and an insertion loss less than 2 dB for center frequencies above 2506 MHz). This insertion loss corresponds to a 2 dB loss in uplink WiMAX link budget, which is highly prohibitive from a WiMAX operator perspective. To compensate for the insertion loss of WiFi notch filter 410, the gain of transmit path 404 must be increased. If WiFi notch filter 410 is placed after PA 316, the insertion loss would have to be offset by increasing the transmit power of PA 316. This, however, is undesirable because PA 316 is typically optimized for a particular output power (e.g., 27 dBm), and increasing the transmit power of PA 316 could cause undesired effects such as the FCC spectrum mask being violated. In contrast, by placing WiFi notch filter 410 before PA 316, the insertion loss can be offset by simply increasing the gain of WiMAX RFIC 320. As such, PA 316 operates as normal, maintaining the desired output power level (e.g., 27 dBm) and satisfying the FCC spectrum mask. Zero degradation in WiMAX uplink link budget is incurred by placing WiFi notch filter 410 before PA 316.

TX diversity switch 318 couples transmit path 404 to both T/R switches 306a and 306b, thereby allowing transceiver 400 to transmit simultaneously using both antennas 308a and 308b.

First and second receive paths 402a and 402b each includes a roofing filter 408, a low-noise amplifier (LNA) 310, and a WiFi notch filter 406. Thus, for space considerations, the WiMAX BPFs 312 used in receive paths 302a and 302b, respectively, in example transceiver 300 are replaced each with a roofing filter 408, placed before LNA 310, and a WiFi notch filter 406, placed after LNA 310, in example transceiver 400.

Roofing filter 408 is a standard blocking filter that serves to protect the WiMAX receiver from other devices (not just WiFi). In an embodiment, roofing filter 408 is a high pass filter with a cutoff frequency around 2 GHz, thus blocking signals below the WiFi and FCC BRS bands. Roofing filter 408 also protects LNA 310 from large saturating signals.

WiFi notch filter 406 is similar to WiFi notch filter 410. WiFi notch filter 406 notches out emissions in the WiFi band from received signals. In other words, WiFi notch filter 406 protects the WiMAX receiver from WiFi signals. WiFi notch filter 406 may be identical to or different from WiFi notch filter 410. In an embodiment, WiFi notch filter 406 and WiFi notch filter 410 are TriQuint® WiFi notch filter (part number: 885010).

As shown in FIG. 4, WiFi notch filters 406a and 406b are placed after LNAs 310a and 310b, respectively, in receive paths 402a and 402b. The inputs of WiFi notch filters 406a and 406b are coupled, respectively, to the outputs of LNAs 310a and 310b, and the outputs of WiFi notch filters 406a and 406b are coupled to inputs of WiMAX RFIC 320. The placement of WiFi notch filters 406 after LNAs 310 (as opposed to before LNAs 310) is significant for optimal performance. As noted above, WiFi notch filters 406 have an insertion loss of approximately 2 dB. Placing WiFi notch filters 406 before LNAs 310s results in approximately 4 dB insertion loss before reaching LNAs 310 (approximately 2 dB insertion loss due WiFi notch filter 406 and 2 dB insertion loss due to roofing filter 408). Thus, despite LNAs 310 having a good noise figure, significant sensitivity degradation would be experienced by placing WiFi notch filters 406 before LNAs 310. In addition, WiFi notch filters 406 do not provide additional protection against the blocking effect of a strong adjacent interferer (like WiMAX BPFs 312 do in transceiver 300). As such, there is no benefit in placing WiFi notch filters 406 before LNAs 310. As such, WiFi notch filters 406 are placed after LNAs 310 according to embodiments of the present invention.

Figure 5:
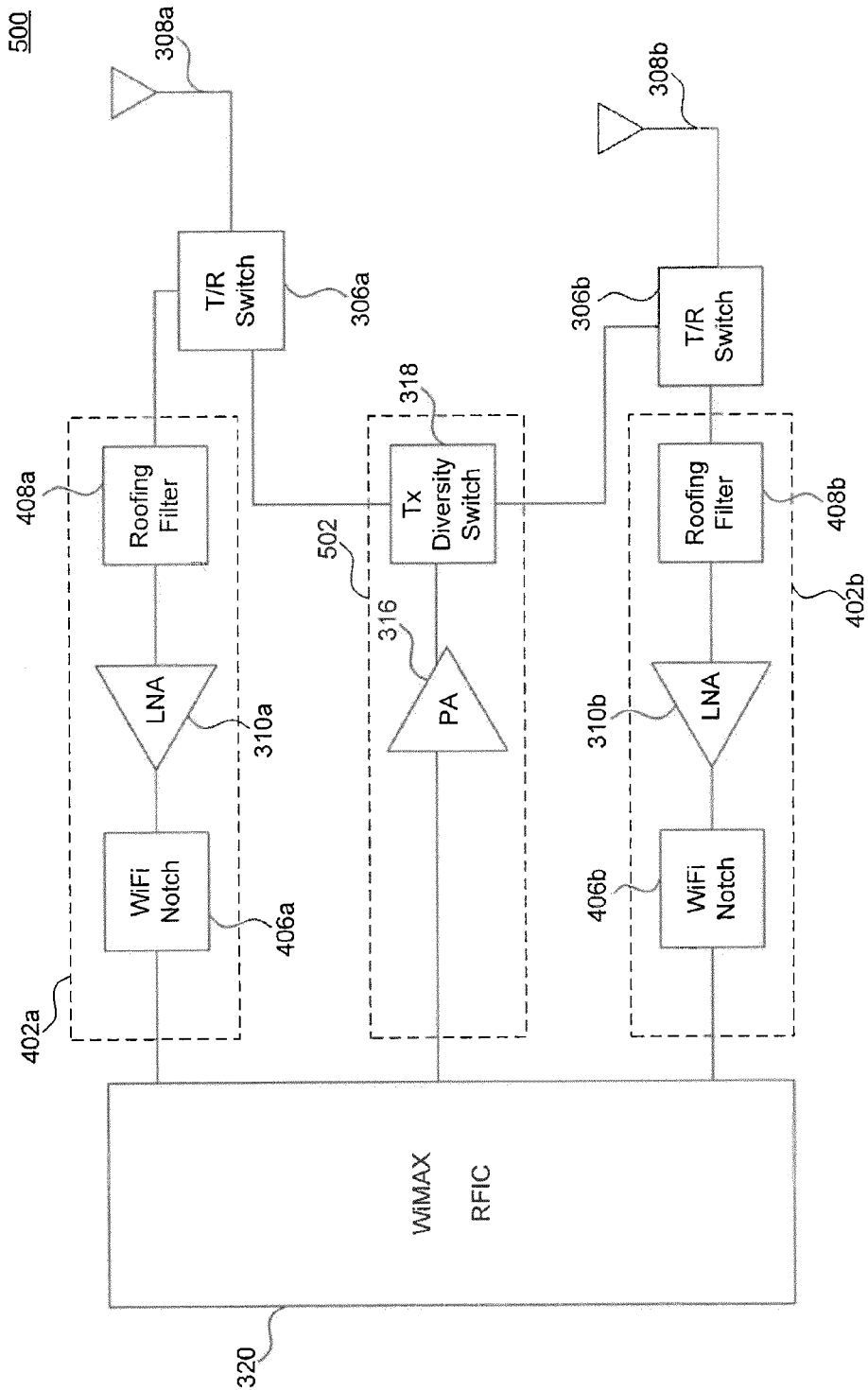
FIG. 5 illustrates an example WiMAX transceiver according to an embodiment of the present invention.

FIG. 5 illustrates another example WiMAX transceiver 500 according to an embodiment of the present invention. Transceiver 500 may be used in WiWi device 102 for WiMAX transceiver 108. Transceiver 500 is most suitable for use in a portable router or phone that provides short WiFi range (less than 40 feet), but may also be used in a fixed WiWi CPE.

Transceiver 500 is similar to transceiver 400 described above in FIG. 4. In particular, transceiver 500 includes identical receive paths 402a and 402b as transceiver 400. However, because transceiver 500 is intended for use in a portable router or phone that provides only a short WiFi range (less than 40 feet), no WiFi notch filter is placed before PA 316 in transmit path 502 of transceiver 500. As such, the transmit output of WiMAX RFIC 320 is directly coupled to the input of PA 316. As described above, in transceiver 400, WiFi notch filter 410 notches out emissions in the WiFi band from WiMAX transmissions from WiMAX RFIC 320, thus improving WiFi performance. With only short WiFi range required, however, WiFi notch filter 410 can be removed without significant WiFi performance degradation. On the other hand, by removing WiFi notch filter 410, cost and bill of material (BOM) savings can be realized in transceiver 500 compared to transceiver 400.

Figure 6:
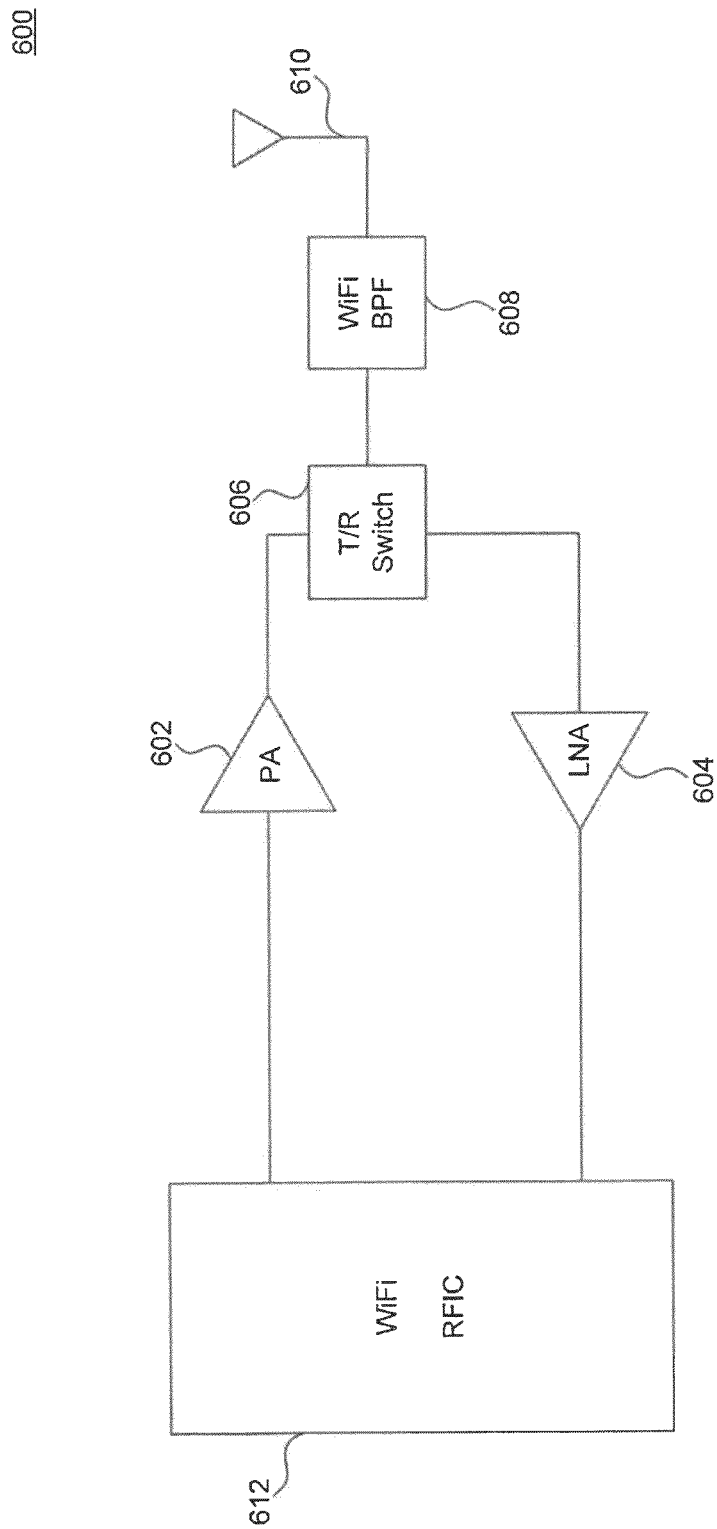
FIG. 6 illustrates an example WiFi transceiver according to an embodiment of the present invention.

FIG. 6 illustrates an example WiFi transceiver 600 according to an embodiment of the present invention. Transceiver 600 may be used in WiWi device 102 for WiFi transceiver 110. Transceiver 600 is suitable for use in a fixed WiWi CPE, a WiWi portable router, or a WiFi/WiMAX-enabled smart phone with a tethering feature, for example.

As shown in FIG. 6, transceiver 600 includes a WiFi RFIC 612 coupled to a RF analog front end. WiFi RFIC 612 includes an RF input/output section, a RF to baseband section, and a baseband to RF section (not shown in FIG. 6). The RF analog front end includes a transmit path, including a PA 602, and a receive path, including a LNA 604. A T/R switch 606 couples the transmit path and the receive path to an antenna 610, and allows the transmit path and the receive path to share antenna 610.

A WiFi band-pass filter (BPF) 608 is placed between T/R switch 606 and antenna 610. The placement of WiFi BPF 608 between T/R switch 606 and antenna 610 allows for cost and BOM savings. In particular, by placing WiFi BPF 608 between T/R switch 606 and antenna 610, WiFi BPF 608 can be reused as a transmit filter and a receive filter. This is especially advantageous given that WiFi transmit and receive channels use same channel frequencies in a TDD manner.

WiFi BPF 608 band-pass filters WiFi transmissions from WiFi RFIC 612 to eliminate or reduce any out-of-WiFi-channel emissions which can affect the reception of a co-located (or proximate) WiMAX transceiver. At the same time, WiFi BPF 608 band-pass filters signals received from antenna 610 to eliminate or reduce any out-of-WiFi-channel emissions which can affect the reception of the WiFi receiver. In an embodiment, WiFi BPF 608 is a BAW filter with small insertion loss in the WiFi channels, especially channels 1, 6, and 11. WiFi BPF 608 may be, for example, a Cirocomm® WiFi band-pass filter (part number: 426A-0409) or a Triquint® WiFi band-pass filter (part number: 8850007).

Embodiments have been described above with respect to a WiFi and a WiMAX transceiver operating in close proximity to one another. Embodiments, however, are not limited to WiFi and WiMAX. For example, the WiMAX transceiver in the embodiments described above may be replaced with a LTE (Long Term Evolution) transceiver, operating in close proximity with the WiFi transceiver. Similarly, the WiFi transceiver in the embodiments described above may be replaced with a Bluetooth transceiver, operating in close proximity with the WiMAX transceiver. Also, the WiMAX transceiver and WiFi transceiver in the embodiments described above may both be replaced with a LTE transceiver and a Bluetooth transceiver, respectively.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present invention should not be limited by any of the above-described exemplary embodiments, but should be defined only in accordance with the following claims and their equivalents.

What is claimed is:

1. A device, comprising:
an LTE transceiver; and
a WiFi transceiver;
wherein the LTE transceiver comprises:
an LTE radio frequency (RF) integrated circuit (RFIC); and
a first RF analog front end, coupled to the LTE RFIC;
wherein the first RF analog front end comprises:
an LTE transmit path, including a first LTE band-pass filter (BPF) and a first power amplifier (PA), the first LTE BPF placed before the first PA in the LTE transmit path, and wherein the first LTE BPF is configured to band-pass filter LTE transmissions from the LTE RFIC to reduce emissions outside of an LTE frequency band contained in the LTE transmissions; and first and second LTE receive paths, each including a first low-noise amplifier (LNA) and a second LTE BPF, the second LTE BPF placed before the first LNA in the first and second LTE receive paths.

2. The device of claim 1, wherein the first RF analog front end further comprises:
a first transmit/receive (T/R) switch configured to couple the first LTE receive path and the LTE transmit path to a first antenna; and
a second T/R switch configured to couple the second LTE receive path and the LTE transmit path to a second antenna.

3. The device of claim 2, wherein the LTE transmit path further comprises:
a transmit (TX) diversity switch, placed after the first PA in the LTE transmit path, configured to couple the LTE transmit path to the first and second T/R switches.

4. The device of claim 1, wherein the second LTE BPF is configured to band-pass filter received signals to reduce emissions outside of an LTE frequency band contained in the received signals.

5. The device of claim 1, wherein the WiFi transceiver comprises:
a WiFi RFIC; and
a second RF analog front end, coupled to the WiFi RFIC;
wherein the second RF analog front end comprises:
a WiFi transmit path, including a second PA;
a WiFi receive path, including a second LNA;
a transmit/receive (T/R) switch configured to couple the WiFi transmit path and the WiFi receive path to an antenna; and
a WiFi BPF placed between the T/R switch and the antenna.

6. The device of claim 5, wherein the WiFi BPF is configured to band-pass filter WiFi transmissions from the WiFi RFIC to reduce emissions outside of a WiFi channel contained in the WiFi transmissions.

7. The device of claim 5, wherein the WiFi BPF is configured to band-pass filter signals received from the antenna to reduce emissions outside of a WiFi channel contained in said signals.

8. The device of claim 1, wherein the device is configured to communicate with an LTE base station via the LTE transceiver, and to communicate with a WiFi device via the WiFi transceiver.

9. The device of claim 1, wherein an input of the first LTE BPF is coupled to an output of the LTE RFIC, and an output of the first LTE BPF is coupled to an input of the first PA.

10. The device of claim 1, wherein an output of the second LTE BPF is coupled to an input of the first LNA.

11. A device, comprising:
an LTE transceiver; and
a WiFi transceiver;
wherein the LTE transceiver comprises:
an LTE radio frequency (RF) integrated circuit (RFIC); and
a first RF analog front end, coupled to the LTE RFIC;
wherein the first RF analog front end comprises:
an LTE transmit path, including a first power amplifier (PA); and
first and second LTE receive paths, each including a roofing filter, a first low-noise amplifier (LNA), and a first LTE notch filter, the roofing filter placed before the first LNA and the first LTE notch filter placed after the first LNA in the first and second LTE receive paths, wherein the first LTE notch filter is configured to notch out emissions in a WiFi band from received signals.

12. The device of claim 11, wherein the first RF analog front end further comprises:
a first transmit/receive (T/R) switch configured to couple the first LTE receive path and the LTE transmit path to a first antenna; and
a second T/R switch configured to couple the second LTE receive path and the LTE transmit path to a second antenna.

13. The device of claim 12, wherein the LTE transmit path further comprises:
a transmit (TX) diversity switch, placed after the first PA in the LTE transmit path, configured to couple the LTE transmit path to the first and second T/R switches.

14. The device of claim 11, wherein the LTE transmit path further comprises:
a second LTE notch filter placed before the first PA in the LTE transmit path.

15. The device of claim 14, wherein the second LTE notch filter is configured to notch out emissions in a WiFi band from transmissions from the LTE RFIC.

16. The device of claim 11, wherein the roofing filter is a high-pass filter configured to reduce emissions below a WiFi band in received signals.

17. The device of claim 11, wherein the WiFi transceiver comprises:
a WiFi RFIC; and
a second RF analog front end, coupled to the WiFi RFIC;
wherein the second RF analog front end comprises:
a WiFi transmit path, including a second PA;
a WiFi receive path, including a second LNA;
a transmit/receive (T/R) switch configured to couple the WiFi transmit path and the WiFi receive path to an antenna; and
a WiFi band-pass filer (BPF) placed between the T/R switch and the antenna.

18. A device, comprising:
an LTE transceiver; and
a Bluetooth transceiver;
wherein the LTE transceiver comprises:
an LTE radio frequency (RF) integrated circuit (RFIC); and
a first RF analog front end, coupled to the LTE RFIC;
wherein the first RF analog front end comprises:
an LTE transmit path, including a first LTE band-pass filter (BPF) and a first power amplifier (PA), the first LTE BPF placed before the first PA in the LTE transmit path, wherein the first LTE BPF is configured to band-pass filter LTE transmissions from the LTE RFIC to reduce emissions outside of an LTE frequency band contained in the LTE transmissions; and
first and second LTE receive paths, each including a first low-noise amplifier (LNA) and a second LTE BPF, the second LTE BPF placed before the first LNA in the first and second LTE receive paths.

19. The device of claim 18, wherein the second LTE BPF is configured to band-pass filter received signals to reduce emissions outside of an LTE frequency band contained in the received signals.

20. The device of claim 18, wherein the Bluetooth transceiver comprises:
a Bluetooth RFIC; and
a second RF analog front end, coupled to the Bluetooth RFIC;

wherein the second RF analog front end comprises:
- a Bluetooth transmit path, including a second PA;
- a Bluetooth receive path, including a second LNA;
- a transmit/receive (T/R) switch that couples the Bluetooth transmit path and the Bluetooth receive path to an antenna; and
- a Bluetooth BPF placed between the T/R switch and the antenna.

* * * * *

UNITED STATES PATENT AND TRADEMARK OFFICE
CERTIFICATE OF CORRECTION

PATENT NO. : 9,232,564 B2  
APPLICATION NO. : 14/163571  
DATED : January 5, 2016  
INVENTOR(S) : Medapalli et al.

Page 1 of 1

It is certified that error appears in the above-identified patent and that said Letters Patent is hereby corrected as shown below:

In the claims,

In column 10, line 37, replace "filer" with --filter--.

Signed and Sealed this
Fourteenth Day of June, 2016

Michelle K. Lee
*Director of the United States Patent and Trademark Office*